H. A. FRANTZ.
HAY DRIER.
APPLICATION FILED OCT. 13, 1914.
1,161,301. Patented Nov. 23, 1915.
2 SHEETS—SHEET 1.
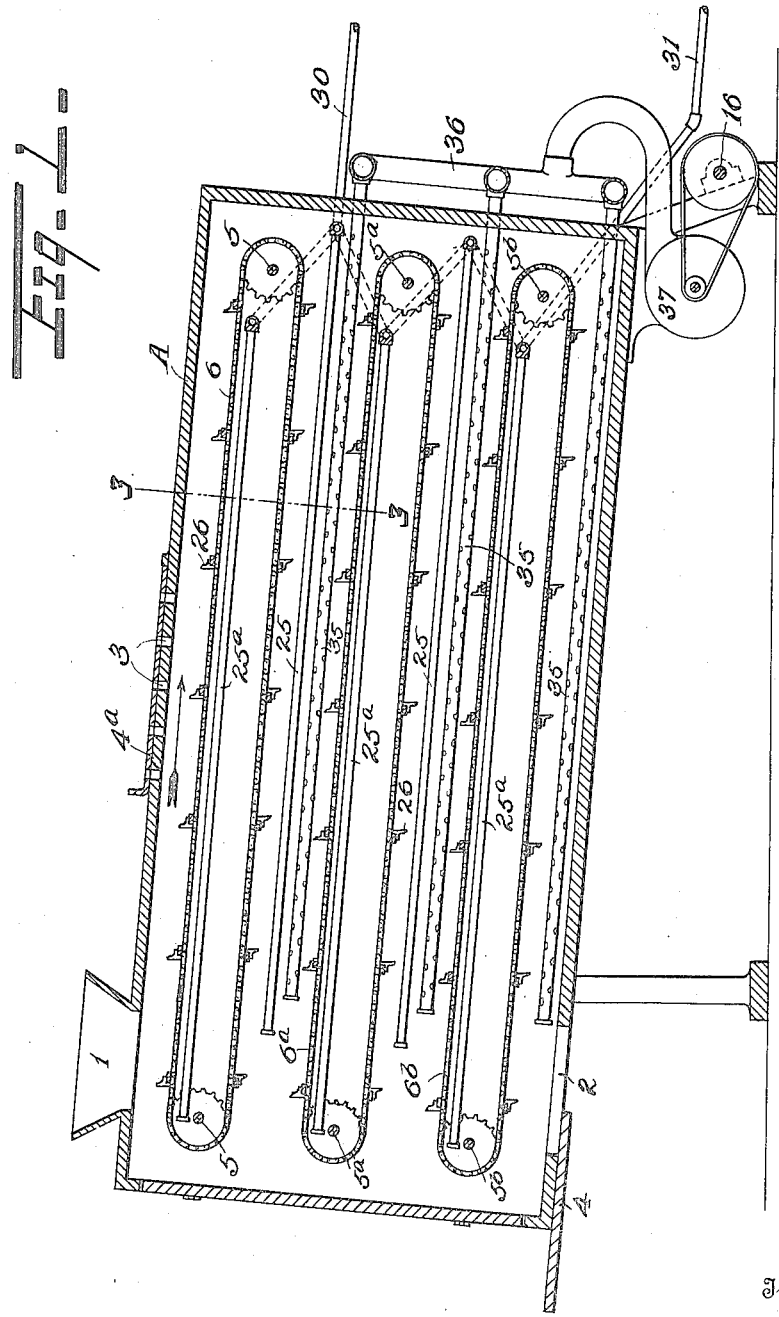
Witnesses
V. L. Stratton
Caleb J. Bieber
Inventor
Hiram A. Frantz,
By
Attorneys

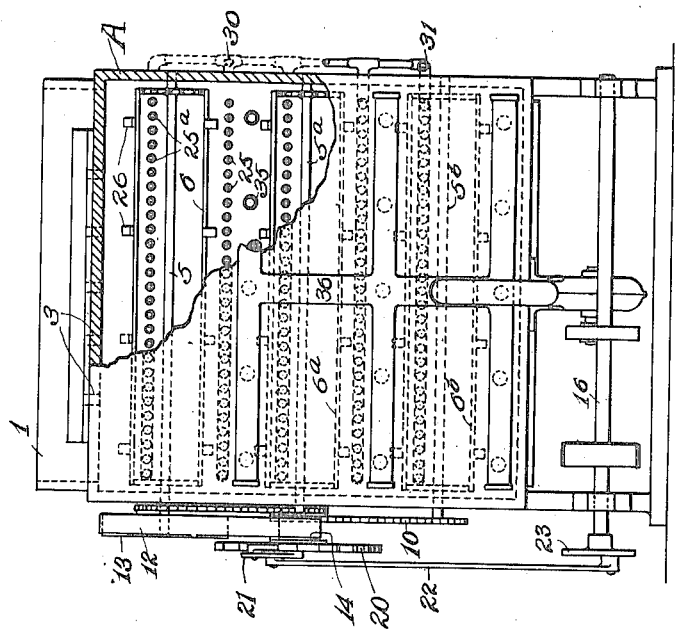
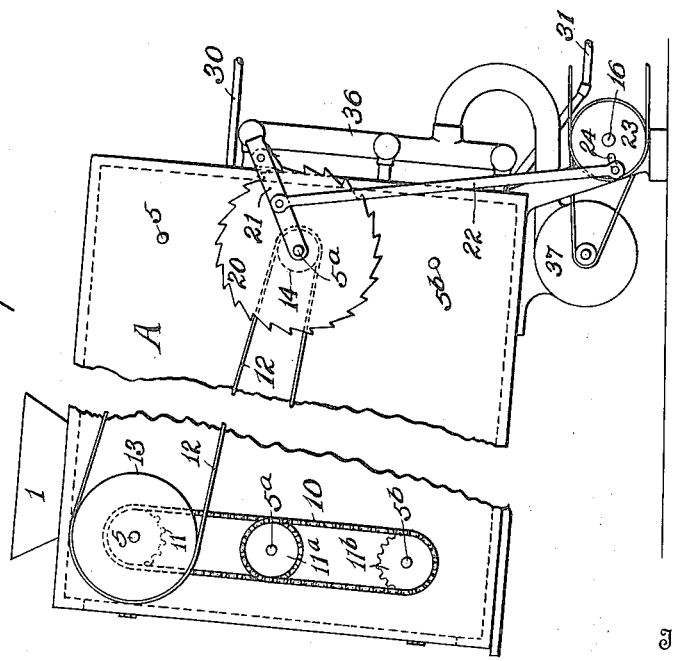

UNITED STATES PATENT OFFICE.

HIRAM A. FRANTZ, OF CHERRYVILLE, PENNSYLVANIA, ASSIGNOR OF ONE-HALF TO BENJAMIN FISH, OF SANFORD, FLORIDA.

HAY-DRIER.

1,161,301.   Specification of Letters Patent.   Patented Nov. 23, 1915.

Application filed October 13, 1914. Serial No. 866,456.

*To all whom it may concern:*

Be it known that I, HIRAM A. FRANTZ, a citizen of the United States, residing at Cherryville, in the county of Northampton and State of Pennsylvania, have invented certain new and useful Improvements in Hay-Driers, of which the following is a specification.

My invention relates particularly to means for drying hay or the like mechanically, and my object is to provide for doing the work quickly, uniformly, and economically without regard to uncertain and varying weather conditions.

The invention is fully described in connection with the accompanying drawings illustrating my improved mechanism, and the novel features are specifically pointed out in the claims.

Figure 1 is a longitudinal sectional view of a machine embodying my invention in preferred form. Fig. 2 is a partial side elevation showing the variable speed drive mechanism for the jointly operated feed belts. Fig. 3 is an end view, with a partial cross-section on the line 3—3 of Fig. 1.

The frame of my machine, as shown, forms a casing A within which the main mechanism is inclosed. This casing is provided, as shown, with suitable openings, as 1 for admitting the material to be acted upon, 2 for discharging the dried material, and 3 for permitting separate escape of the moisture-charged air as may be desired; said openings or certain of them being preferably provided with means, as 4, 4$^a$, for regulating them to best advantage.

Within the casing A, upon a pair of suitable driving shafts 5, 5, respectively mounted adjacent opposite ends of the casing, is a slatted feed-belt 6 as shown, by which the grass or like material admitted to the casing through opening 1 is received. A series of such feed-belts 6, 6$^a$, 6$^b$, is provided as shown, spaced one above another and each similarly mounted upon a corresponding pair of driving shafts, 5—5, 5$^a$—5$^a$, 5$^b$—5$^b$. These feed belts are jointly drawn in the same direction, as indicated, by means of a vertically arranged chain 10, which simultaneously engages similar sprocket wheels 11, 11$^a$, 11$^b$, fixed to respective shafts 5, 5$^a$, 5$^b$; power being conveyed thereto, as shown, by a drive belt 12 engaging a pulley 13 fixed to one of said shafts, and passed over a drive pulley 14 loosely mounted on a shaft 5$^a$ as shown, which pulley 14 is itself driven from a main shaft 16. To provide for varying the speed at which the feed belts are jointly operated, the pulley 14 is driven from the main shaft 16, through a ratchet-wheel 20 fixed to said pulley, a regulated rotary movement being imparted thereto at each rotation of the main shaft, by means of a pawl arm 21, and a rod connection 22 to a crank arm or disk 23 on said main shaft; a slot 24 in said crank arm or disk 23 permitting adjustment of the connection so as to vary the throw of the pawl arm 21 as required to produce a quicker or slower movement of the feed belts as desired.

To provide for properly conveying and delivering the material successively to the several feed belts employed as shown, and for drying the material carried thereby, I provide below each of said feed belts, a horizontal radiator platform 25; so that the material carried on the upper run of said belt will be dropped upon said platform at the turn of the belt around one of its shafts, and be pushed forward thereon toward the other end of the casing, by the conveyer projections 26 provided on the outer surface of the belt, until it drops from the opposite end of the platform onto the feed belt below it. In addition to these radiator platforms below each feed belt, I preferably provide a similar platform 25$^a$ below the upper run of each belt, that is between its upper and lower runs; and I suitably connect all of these radiators. as indicated, with a common steam-supply pipe 30, and return pipe 31, so as to secure circulation of a heating medium whereby all of said radiators are properly heated. These radiator platforms 25 and 25$^a$ are preferably made up of connected parallel pipes, which are spaced apart so as to provide openings or apertures between them; which apertures permit of the requisite passage of air hereinafter referred to, without interfering with the material-supporting functions of the radiators.

To provide for quickly and satisfactorily drying the material I employ in connection with the feed belts and radiator platforms described, perforated air tubes 35, 35, 35 connected in horizontal series, each of which series is arranged below a feed belt, and all of which are connected by a common pipe 36, with a suitable blower 37 or other source of supply. These perforated air tubes extend lengthwise of the casing A and are spaced apart laterally, as shown, thus serving to discharge a fresh supply of air upwardly through the immediately superposed apertured radiator platform and feed-belt, while at the same time permitting free movement of the air discharged by any lower series of air tubes.

It will be readily understood from the foregoing description, that the grass or like material fed to the machine through inlet 1, will be carried in the direction indicated by the arrow, by the upper run of the first feed-belt, and then in reverse direction upon the radiator platform 25 by the lower run of said belt, the projections 26 serving to positively move it at all portions of the travel; and that after dropping from the said radiator platform this action is repeated until the dried material is discharged from the casing through bottom opening 2. At all portions of its travel each layer of the material is subjected to the direct drying action of the adjacent radiator platforms, as well as of the current of radiator-heated air provided, and before discharging at the bottom of the casing the material will be thoroughly dried; this result, and the minimum of time required to accomplish it under given conditions, being insured by proper regulation of the speed of the belts as provided for.

What I claim is:—

1. In a drying mechanism, the combination with a casing having inlet and discharge openings, of a plurality of apertured feed-belts arranged one above another, and provided with pusher projections apertured radiator material-supporting platforms arranged respectively between said belts and between the upper and lower runs of each belt, a blower mechanism arranged to discharge air through said apertured belts and radiator platforms, and means for jointly driving said belts.

2. In a drying mechanism, the combination with a casing having inlet and discharge openings, of plurality of apertured feed-belts arranged one above another, a system of steam pipes arranged to form connected radiator platforms between the belts and between the upper and lower runs thereof, a system of perforated tubes arranged to form a series of connected air-inlet platforms below the respective radiator platforms, and means for jointly driving said belts.

3. In a drying mechanism, the combination with a casing having inlet and discharge openings, of an apertured endless feed-belt therein, apertured radiator platforms under the upper and lower runs respectively of said belt, and means for driving said belt.

4. In a drying mechanism, the combination with a casing having inlet and discharge openings, of an apertured endless feed-belt therein, apertured radiator platforms under the upper and lower runs respectively of said belt, a blower mechanism arranged to discharge air through said apertured platforms and both runs of the belt, and means for driving the latter.

In testimony whereof I affix my signature in presence of two witnesses.

HIRAM A. FRANTZ

Witnesses:
E. AMANDA MARSH,
C. C. MARSH.